United States Patent [19]

Janda et al.

[11] Patent Number: 4,640,936

[45] Date of Patent: Feb. 3, 1987

[54] PHOTOPOLYMERIZABLE PHOSPHATE-CONTAINING ADHESION PROMOTING DENTAL COMPOSITION

[75] Inventors: Ralf Janda, Bad Homburg; Bernhard Eppinger, Wehrheim, both of Fed. Rep. of Germany

[73] Assignee: Kulzer & Co. GmbH, Wehrheim, Fed. Rep. of Germany

[21] Appl. No.: 714,385

[22] Filed: Mar. 21, 1985

[30] Foreign Application Priority Data

Apr. 14, 1984 [DE] Fed. Rep. of Germany ....... 3414163

[51] Int. Cl.$^4$ ................... C08F 130/02; C08F 230/02; C08F 2/50; C08K 5/07
[52] U.S. Cl. .......................................... 522/14; 522/28; 522/79; 522/171; 524/770
[58] Field of Search ................... 204/159.23; 522/171, 522/79

[56] References Cited

U.S. PATENT DOCUMENTS

| | | | |
|---|---|---|---|
| 3,936,557 | 2/1976 | Watt | 522/57 |
| 4,071,424 | 1/1978 | Dart | 204/159.15 |
| 4,259,075 | 3/1981 | Yamauchi et al. | 433/217 |
| 4,259,117 | 3/1981 | Yamauchi | 523/116 |
| 4,368,043 | 1/1983 | Yamauchi et al. | 433/217 |
| 4,514,342 | 4/1985 | Billington | 260/952 |
| 4,533,565 | 8/1985 | Okita | 427/127 |
| 4,536,225 | 8/1985 | Cayless | 148/6.15 R |
| 4,576,976 | 3/1986 | Schaefer | 522/16 |

FOREIGN PATENT DOCUMENTS

| | | |
|---|---|---|
| 0090493 | 5/1983 | European Pat. Off. |
| 1617583 | 7/1970 | Fed. Rep. of Germany |
| 56490 | 4/1982 | Japan |
| 167364 | 10/1982 | Japan |

*Primary Examiner*—Melvyn I. Marquis
*Assistant Examiner*—A. H. Koeckert
*Attorney, Agent, or Firm*—Frishauf, Holtz, Goodman & Woodward

[57] ABSTRACT

A dental composition which when used together with a photopolymerizable dental sealing composition promotes adhesion of resin-based dental restorative materials to the tooth consisting of
a solution of (i) at least one phosphate selected from the group consisting of methacryloyloxyethyl dihydrogen phosphate and bis-(methacryloyloxyethyl) hydrogen phosphate and (ii) a photopolymerization catalyst comprising camphor quinone and an amine, in acetone.

14 Claims, No Drawings

PHOTOPOLYMERIZABLE PHOSPHATE-CONTAINING ADHESION PROMOTING DENTAL COMPOSITION

The invention relates to an adhesion promoting dental composition prepared from a solution of a methacryloyloxyethyl phosphate in a volatile organic solvent.

BACKGROUND

In tooth restoration the bonding strength of restorative dental materials to tooth (enamel and dentin) is of great importance, because insufficient bonding strength cause formation of marginal gaps generating recurrent caries.

When tooth cavities are filled with a polymerizable resin-based tooth filling material, before the filling is introduced, the tooth enamel is treated with an acidic etching solution, for instance a dilute phosphoric acid solution, and is also coated, if necessary, with a sealing material of low viscosity, which typically contains monomeric dimethacrylates and can be hardened chemically or by photopolymerization. Because of their good physical properties sealing materials which in addition to the monomers contain a fine-grained inorganic filler have proven to be particularly suitable. They adhere because they are mechanically anchored in the etched tooth enamel.

From the standpoint of the dental practitioner, however, etching of the tooth dentin is not recommended. Therefore whenever anchoring by etching the tooth enamel is impossible, Such as in cervical cavities, adhesion promotors are used to improve the adhesion between the dentin and the resin. Many such dental adhesion promotors are known, including those described in the following references which are incorporated herein.

Adhesive Restorative Dental Materials 1961, 195-198 contains a report on the adhesion-improving effect of bis-(methacryloyloxyethyl) hydrogen phosphate and of some dihydrogen phosphates containing methacryloyloxy groups.

An adhesive for teeth which comprises a solution of a polymerizable hydrogen phosphate in an organic solvent, such as ethanol, ethyl ether or chloroform, is described in German Examined Patent Application DE-AS 27 11 234 and corresponding U.S. Pat. Nos. 4,259,075, 4,259,117 and 4,368,043.

From European Patent Application 88 527, a material for improving adhesion (called an "adhesion promotor") is known, which comprises a solution of dihydrogen phosphate, having at least three methacryloyloxy groups, in a volatile organic solvent, especially an alkanol. An adhesive or sealing material (called an "intermediate bonding resin") can be used together with this material to increase the adhesion of the tooth filling material to the tooth substance.

From published Japanese Patent Applications 57-56490 and 57-167364, the use of tetramethacryloyloxyethyl pyrophosphate in dental materials is known (Chemical Abstract Vol. 98, 1983, 34, 758 and 204 455).

THE INVENTION

It is an object of the invention to provide a composition which promotes the adhesion of a photopolymerizable sealing material to the dentin by chemical bonding without etching.

Briefly, this object is attained by means of an adhesion promoting composition which consists of a solution of methacryloyloxyethyl dihydrogen phosphate and/or bis-(methacryloyloxyethyl) hydrogen phosphate and a photopolymerization catalyst in acetone.

The adhesion promoting composition preferably contains from 10 to 30% by weight, and more preferably from 15 to 20% by weight, of the phosphate or phosphates.

The mixtures of ketones and amines known from British Pat. No. 1,408,265, and the corresponding U.S. Pat. No. 4,071,424 (which is incorporated herein) and preferably mixtures of camphor quinone and amines or of camphorquinone, a benzil acetal or benzoyl alkanol, and amines such as 4-dimethylaminobenzoic acid 2-butoxyethylester, have proved to be suitable photopolymeriszation catalysts in the present invention.

The adhesion promoting composition preferably contains from 0.1 to 0.5% by weight each of the camphor quinone, the amine and the benzoyl compound.

By using the adhesion promoting composition according to the invention together with a photopolymerizable sealing material in combination with any conventionally known polymerizable resin-based restorative dental material, a strong and durable bond between the dentin and the resin can be achieved. The adhesion promoting composition is easy to handle (mixing is not needed) and can be stored in a single pack over a long period of time when protected against light.

The acetone present in the highly adhesion promoting composition, which is applied to the dentin in a thin layer, effects excellent wetting of the dentin surface and uniform spreading of the composition. A further advantage of the acetone is that as it evaporates, any traces of moisture on the dentin disappear as well.

After evaporation of the acetone the remaining uncured adhesion promoting layer can remain unpolymerized, but it is preferred to harden it by exposure to UV light, or especially by exposure to visible light. The sealing material, which is to be applied after the acetone evaporates or after the adhesion promoting layer is hardened and which contains a photopolymerization catalyst, may be hardened by exposure to UV light, but is preferably hardened by exposure to visible light.

In restoration of tooth cavities a polymerizable resin-based dental filling material is then introduced. Because of photopolymerizable adhesion promoting composition and photopolymerizable sealing material it is very convenient to introduce a dental filling material capable of being hardened by photopolymerization too.

With the adhesion promoting composition according to the invention, containing a photopolymerization catalyst, stronger adhesion is attained than with a composition not containing a catalyst of this kind.

DETAILED DESCRIPTION

The following example of the preparation of adhesion promoting composition according to the invention provides a more detailed explanation.

The adhesive strength (bonding strength) between the dentin and the resin-based tooth filling material which is attained with these compositions using a photopolymerizable sealing material, is specified.

EXAMPLE

Adhesion promoting compositions A and B are prepared by mixing (a)

79.5 g acetone, absolute
20.0 g methacryloyloxyethyl dihydrogen phosphate
0.1 g 1,2-diphenyl-2,2-dimethoxyethanone
0.3 g camphorquinone and
0.1 g 4-dimethylaminobenzoic acid 2-butoxyethyl ester and (b)

79.5 g acetone, absolute
20.0 g bis-(methacryloyloxyethyl) hydrogen phosphate
0.1 g 1,2-diphenyl-2,2-dimethoxyethanone
0.3 g camphor quinone and
0.1 g 4-dimethylaminobenzoic acid 2-butoxyethyl ester.

Each of these compositions is coated on the dentin surface, which has been sawed flat with a diamond saw and polished and dried, of different extracted teeth. After the acetone has evaporated, the remaining unhardened adhesion promoting layer consisting of methacryloyloxyethyl dihydrogen phosphate or bis-(methacryloyloxyethyl) hydrogen phosphate and photopolymerization catalyst is hardened by a 20-second exposure to the Translux halogen light unit made by Kulzer. A thin layer of the photopolymerizable sealing material known as Durafill bond, made by Kulzer and comprising dimethacrylate, photopolymerization catalyst and inorganic filler (about 40% by weight), is applied over the layer of said compositions. The Durafill bond layer is hardened by a 20-second exposure to the halogen light unit and then covered with the photopolymerizable resin-based tooth filling material known as Durafill, made by Kulzer and comprising dimethacrylate, photopolymerization catalyst, inorganic filler (about 50% by weight) and splinter polymer (obtained by polymerization of dimethacrylate and silicon dioxide of fine particle size and powdering), which in turn is hardened by a 20-second exposure to the halogen light unit.

The teeth so treated were subjected to shearing tests, to ascertain the strength of the bond between the dentin and the resin. The values obtained in these tests, performed immediately after the tooth filling material has hardened and after storage in water at 37° C. for 7 days and for 40 days are given in the following table.

| Composition | Bonding strength [N/mm$^2$] | | |
|---|---|---|---|
| | Immediately after hardening | after 7 days in 37° C. water | after 40 days in 37° C. water |
| A | 5.5 | 4.0 | 4.0 |
| B | 6.2 | 5.0 | 5.0 |

The adhesion promoting compositions A and B shown in the example are evaluated for resistance to thermal cycling. The extracted teeth treated as described are thermally cycled between 5° and 55° C. for 2500 cycles and then subjected to shearing tests. The average measured bonding strength is 4 and 5N/mm$^2$ respectively, indicating the excellent hydrolytic and thermal stability of the dentin-resin bond formed with the adhesion promoting compositions.

We claim:

1. An adhesion promoting dental composition for use together with a photopolymerizable dental sealing composition consisting essentially of
   a solution of (i) 10 to 30% by weight of at least one phosphate selected from the group consisting of methacryloyloxyethyl dihydrogen phosphate and bis-(methacryloyloxyethyl) hydrogen phosphate and (ii) a photopolymerization catalyst comprising camphor quinone and an amine, in acetone.

2. The composition of claim 1 containing from 15 to 20% by weight of said phosphate component (i).

3. The composition of claim 2 wherein said photopolymerization catalyst comprises camphor quinone, a benzil acetal or benzoyl alkanol and an amine.

4. The composition of claim 1 wherein said photopolymerization catalyst comprises camphor quinone, a benzil acetal or benzoyl alkanol and an amine.

5. The composition of claim 1 wherein said photopolymerization catalyst comprises camphor quinone, 1,2-diphenyl-2,2-dimethoxyethanone and 4-dimethylaminobenzoic acid 2-butoxyethyl ester.

6. The composition of claim 2 wherein said photopolymerization catalyst comprises camphor quinone, 1,2-diphenyl-2,2-dimethoxyethanone and 4-dimethylaminobenzoic acid 2-butoxyethyl ester.

7. The composition of claim 6, wherein said phosphate (i) is methacryloyloxyethyl dihydrogen phosphate.

8. The composition of claim 1, wherein said phosphate (i) is methacryloyloxyethyl dihydrogen phosphate.

9. The composition of claim 2, wherein said phosphate (i) is methacryloyloxyethyl dihydrogen phosphate.

10. The composition of claim 3, wherein said phosphate (i) is methacryloyloxyethyl dihydrogen phosphate.

11. The composition of claim 6, wherein said phosphate (i) is bis-(metharyloyloxyethyl) hydrogen phosphate.

12. The composition of claim 1, wherein said phosphate (i) is bis-(metharyloyloxyethyl) hydrogen phosphate.

13. The composition of claim 2, wherein said phosphate (i) is bis-(metharyloyloxyethyl) hydrogen phosphate.

14. The composition of claim 3, wherein said phosphate (i) is bis-(metharyloyloxyethyl) hydrogen phosphate.

* * * * *